(12) United States Patent
Shimabukuro et al.

(10) Patent No.: US 6,346,062 B1
(45) Date of Patent: Feb. 12, 2002

(54) HYBRID VEHICLE

(75) Inventors: Eijiro Shimabukuro; Naohisa Morishita; Kazuo Ooyama, all of Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/472,182

(22) Filed: Dec. 27, 1999

(30) Foreign Application Priority Data

Dec. 28, 1998  (JP) ............................................ 10-372046

(51) Int. Cl.$^7$ ................................................ B60K 41/02
(52) U.S. Cl. .................................... 477/5; 477/8; 475/5
(58) Field of Search .............................. 477/5, 6, 8, 12; 475/1, 4, 5; 180/65.2

(56) References Cited

U.S. PATENT DOCUMENTS

| | | | | |
|---|---|---|---|---|
| 3,923,115 A | * | 12/1975 | Helling ....................... | 180/65.2 |
| 4,438,342 A | * | 3/1984 | Kenyon ................. | 180/65.2 X |
| 5,168,975 A | * | 12/1992 | Bernhardt et al. ............ | 477/39 |
| 5,285,111 A | * | 2/1994 | Sherman .................... | 180/65.2 |
| 5,704,440 A | * | 1/1998 | Urban et al. ............... | 180/65.2 |
| 5,755,303 A | * | 5/1998 | Yamamoto et al. ........ | 180/65.2 |
| 6,007,443 A | * | 12/1999 | Onimaru et al. ............... | 475/5 |
| 6,123,163 A | * | 9/2000 | Otsu et al. .................. | 180/65.8 |

* cited by examiner

Primary Examiner—Charles A. Marmor
Assistant Examiner—Ha Ho
(74) Attorney, Agent, or Firm—Armstrong, Westerman, Hattori, McLeland & Naughton, LLP

(57) ABSTRACT

A hybrid vehicle including an internal combustion engine; a continuously variable transmission for transmitting a force between a first pulley and a second pulley through a metal belt; and a motor. An output shaft of the internal combustion engine is connected to the first pulley. The second pulley is connected to an output shaft of the motor. The output shaft of the motor is connected to a driving force transmitting device for transmitting a driving force from the second pulley and the motor. The motor and the driving force transmitting device are connected to the second pulley via an engaging element for selectively connecting or disconnecting the transmission of the driving force to the second pulley. The engaging element disconnects the transmission of the force when the internal combustion engine is stopped.

4 Claims, 3 Drawing Sheets

HYBRID VEHICLE

BACKGROUND OF THE INVENTION

1. Field of the Invention

The present invention relates to a hybrid vehicle which has a continuously variable transmission using a metal belt, and which is driven by both electric energy and mechanical energy from an internal combustion engine.

This application is based on Japanese Patent Application No. 10-372046, the contents of which are incorporated herein by reference.

2. Description of the Related Art

To reduce emission of toxic substances in the air, electric vehicles have been developed. These electric vehicles, which are driven only by electric energy, have a limited driving range, depending on the capacities of batteries for storing the electric energy. To obtain a sufficient driving range, the batteries must have enormous capacities, which significantly deteriorate the driving performances. Therefore, hybrid vehicles, which use batteries with reduced size, can ensure sufficient driving range, and can improve the driving performances by driving internal combustion engines with fossil fuel while obtaining the mechanical energy and electric energy from the internal combustion engines, have been developed.

Of these hybrid vehicles, a hybrid vehicle which adds a driving/regenerating motor at a predetermined reduction ratio to the driving shaft of a conventional vehicle which has a continuously variable transmission (CVT) using a metal belt, is known. To manufacture this hybrid vehicle, an existing power plant can be utilized as is, and the weight and costs of the system and investment in the manufacturing plant and machinery can be reduced because the additional electrical parts are small.

An example of the hybrid vehicle is shown in FIGS. 4 and 5. FIG. 4 is a schematic diagram showing the power train of the hybrid vehicle 1, and FIG. 5 is a schematic diagram showing the hydraulic circuit of the hybrid vehicle 1.

In the power train shown in FIG. 4, the force from the engine (internal combustion engine) E is input via a torque converter 2 to a forward/reverse switching planetary gear set 3. As shown in FIG. 5, the forward/reverse switching planetary gear set 3 selectively engages with one of frictional elements 6 and 7, which are hydraulically actuated, by a hydraulic switching valve 5 mechanically connected to a select lever 4, in response to the operation of a select lever 4. Thus, the rotational direction of the force from the engine E, which is input to a driving pulley (first pulley) 9 of a CVT 8 shown in FIG. 4, can be switched.

Further, the rotation of the driving pulley 9 is transmitted via a metal belt 10 to a driven pulley (second pulley) 11. The ratio of the rotational speeds of the driving pulley 9 to the driven pulley 11 depends on the wrapping diameters of the metal belt 10 around the pulleys. The wrapping diameters are controlled by pressing forces produced by the oil pressure given to side houses 12 and 13 of the pulleys. The oil pressure is produced by an oil pump (oil pressure producing mechanism) 14 which is driven by the engine E.

The force transmitted to the driven pulley 11 is further transmitted via the final reduction gear (driving force transmitting device) 15 to a drive shaft 16, which drives driving wheels W. The final reduction gear 15 is connected via a gear 17 to the output shaft from the driving/regenerating motor M.

The driving/regenerating motor M is electrically connected to the battery and the motor controller which are not shown.

The hybrid vehicle 1 can convert the kinetic energy of the vehicle into electrical energy (regeneration) by means of the driving/regenerating motor M when the vehicle decelerates. Further, once the engine E is stopped while the vehicle is parked, the vehicle can be restarted by the driving/regenerating motor M in response to the request from the driver. When the driver demands more power, the engine E is additionally started, and the force is transmitted via the CVT 8 to the drive shaft 16, to thereby provide sufficient driving force.

As described above, by adding electrical parts which are smaller than those of an electric vehicle to the metal belt CVT, the kinetic energy of the vehicle can be effectively collected. The engine may be stopped while the vehicle is parked, and therefore the fuel consumption can be remarkably improved.

However, although the above-mentioned hybrid vehicle 1 has improved fuel consumption, the following problems arise.

When driving only by the driving/regenerating motor M while stopping the engine E, the CVT 8 is rotated as the driving/regenerating motor M is rotated, because the output shaft of the driving/regenerating motor M is always connected to the driven pulley 11 of the CVT 8. The force for rotating the CVT 8 becomes a burden on the driving/regenerating motor M, which causes energy loss. Further, in this situation, because the oil pump 14 is driven by the engine E, the oil pressure is not available when the engine E is stopped. Therefore, the pressing forces for rotating the metal belt 10 and the driving and driven pulleys 9 and 11 together without slippage do not act effectively, and the metal belt 10 may slip on the driving pulley 9 and on the driven pulley 11 at a relative speed. The relative slippage between the metal belt and the pulleys must be prevented under all circumstances, and if it is not prevented, their lives may be adversely affected.

Further, when starting the engine E after the starting of the vehicle by the driving/regenerating motor M, the oil pump 11 may be actuated at the same time as the starting of the engine E. When the unstable oil pressure just after the start-up of the oil pump 11 is provided to the frictional elements 6 and 7 and the side houses 12 and 13, the driving force from the engine E may be unstably transmitted to the drive shaft 16.

BRIEF SUMMARY OF THE INVENTION

The present invention is intended to reduce the energy loss caused by driving the vehicle by the motor while stopping the internal combustion engine, and to prevent the degradation of the continuously variable transmission using the metal belt. Further, the present invention is intended to ensure driving comfort when starting the internal combustion engine while driving the vehicle only by the motor.

According to a first embodiment of the present invention, the hybrid vehicle comprises: an internal combustion engine (i.e., an engine E in the embodiment); a continuously variable transmission (a CVT 8 in the embodiment); for transmitting a force between a first pulley (a driving pulley 9 in the embodiment) and a second pulley (a driven pulley 11 in the embodiment) through a metal belt (the metal belt 10 in the embodiment); and a motor (a driving/regenerating motor M in the embodiment), wherein an output shaft of the internal combustion engine is connected to the first pulley, the second pulley is connected to an output shaft of the motor, the output shaft of the motor is connected to a driving force transmitting device (a final reduction gear 15 in the embodiment) for transmitting a driving force from the second pulley and the motor, the motor and the driving force transmitting device are connected to the second pulley via an engaging element (a clutch 22 in the embodiment) for selectively connecting or disconnecting the transmission of the driving force to the second pulley, and the engaging element disconnects the transmission of the force when the internal combustion engine is stopped.

The hybrid vehicle does not transmit the driving force from the motor to the continuously variable transmission when driving the vehicle only by the motor. Thus, the continuously variable transmission does not become a load on the motor.

According to a second invention, the hybrid vehicle of the first invention, the continuously variable transmission presses the metal belt onto the first pulley and onto the second pulley by oil pressure from an oil pressure producing mechanism (an oil pump 14 in the embodiment) which is driven by the internal combustion engine.

Even when driving the vehicle only by the motor while the internal combustion engine is stopped, and when the pressing force between the first and second pulleys and the metal belt is not sufficient because the oil pressure is not provided to the continuously variable transmission, the hybrid vehicle does not rotate the first and second pulleys and the metal belt.

According to a third invention, the hybrid vehicle of the first or second invention, further comprises a transmitted force control mechanism (an electrically controlled pressure control valve 23 in the embodiment) for controlling the transmission of the force through the engaging element when starting the internal combustion engine while driving the vehicle only by the motor.

When starting the internal combustion engine while driving the vehicle only by the motor, the internal combustion engine is not immediately connected to the motor, and this reduces the shock due to the connection. Further, even in the second invention having the continuously variable transmission operated by the oil pressure, the continuously variable transmission is prevented from being rotated when an unstable oil pressure just after the start-up is provided to the continuously variable transmission, and the transmission of the shock to the drive wheels can be avoided.

According to a fourth invention, in the hybrid vehicle of the second or third invention, the engaging element is operated by oil pressure from the oil pressure producing mechanism, connects the transmission of the force when the oil pressure is provided to the engaging element, and disconnects the transmission of the force when the oil pressure is not provided to the engaging element.

The hybrid vehicle simplifies the mechanism for disconnecting the transmission of the force when the internal combustion engine is stopped. Further, by controlling the oil pressure, the transmitted force control mechanism for controlling the transmission of the force is simplified.

DETAILED DESCRIPTION OF THE INVENTION

Figure 1:
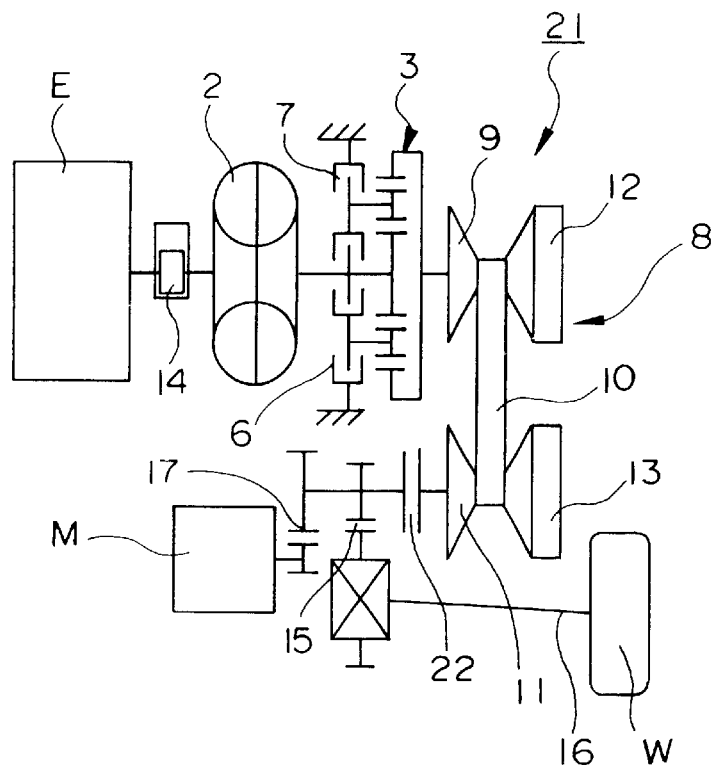
FIG. 1 is a schematic diagram showing the power train of the embodiment of the hybrid vehicle of the present invention.

The embodiment of the present invention will be explained with reference to figures. In this embodiment, the same reference numerals will denote the parts previously mentioned in the conventional technique, and detailed descriptions will be omitted.

FIG. 1 shows the power train of the hybrid vehicle 21 of the embodiment according to the present invention. The difference between the hybrid vehicle 21 and the conventional hybrid vehicle 1 is that a clutch (engaging element) 22 with a final reduction gear 15 is provided between a driven pulley 11 and a driving/regenerating motor M.

Figure 2:
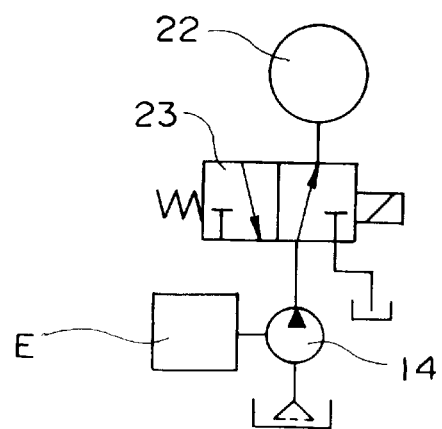
FIG. 2 is a schematic diagram showing a hydraulic circuit for operating a clutch (engaging element) in the hybrid vehicle shown in FIG. 1.

As shown in FIG. 2, the clutch 22 is actuated by the oil pressure supplied from the oil pump 14, which is connected to the engine E, via an electrically controlled pressure control valve (transmitted force control mechanism) 23. The electrically controlled pressure control valve 23 partially releases the oil pressure produced by the oil pump 14 to control the torque transmitted via the clutch 22. Thus, the connection or disconnection of the transmitted force is selectively controlled by the clutch 22, and an intermediate state therebetween (half-engaged clutch state) can be provided.

The clutch 22 is released by stopping the oil pump 14 as the engine E is stopped, so that the transmission of the force from the driven pulley 11 to the final reduction gear 15 or to the driving/regenerating motor M is disconnected.

Further, the electrically controlled pressure control valve 23 controls the transmission of the force via the clutch 22 when starting the engine E while driving the vehicle only by the driving/regenerating motor M. Specifically, the electrically controlled pressure control valve 23 controls the oil pressure so as to gradually increase the force transmitted by the clutch 22 from zero through the half-engaging clutch state to a predetermined torque (e.g., 5.0 kgfm) within a predetermined time of period (e.g., 1.0 sec.).

In the hybrid vehicle 21 with the construction described above, when the engine E is stopped to reduce the fuel consumption after or just before parking of the vehicle, the oil pump 14 is simultaneously stopped, the oil pressure is not supplied to the clutch 22, and the clutch 22 is released so that the transmission of the force between the driven pulley 11 and the final reduction gear 15 is disconnected. In this situation, when starting the vehicle by the driving/regenerating motor M while stopping the engine E, the clutch 22 remains in the released state because the oil pump 14 is stopped as well as the engine E. Therefore, the force from the driving/regenerating motor M is not transmitted to the CVT 8, so that the CVT 8 is idled, and does not cause any load on the driving/regenerating motor M. Thus, the energy loss can be prevented.

Because the oil pump 14 is stopped, the oil pressure is not provided to the side houses 12 and 13 of the driving pulley 9 and the driven pulley 11 of the CVT 8, and the pressing force between the driving and driven pulleys 9 and 11 and the metal belt 10 is not sufficient. At that time, because the clutch 22 is released and the force from the driving/regenerating motor M is not transmitted to the CVT 8, the CVT 8 is prevented from being rotated while the pressing force between the pulleys and the metal belt 10 is not sufficient. The metal belt 10 does not slip on the pulleys at a relative speed, and the adverse effects on the life of the metal belt 10 can be avoided.

Further, in the hybrid vehicle 21, when starting the engine E after the starting of the vehicle by the driving/regenerating motor M, the electrically controlled pressure control valve 23 prevents the transmission of a shock from the engine E to the drive shaft 16 as follows.

That is, when starting the engine E, the oil pump 11 is simultaneously actuated, and the unstable oil pressure just after the start-up of the oil pump 11 is provided from the oil pump 11 to the side houses 12 and 13 of the CVT 8.

Figure 5:
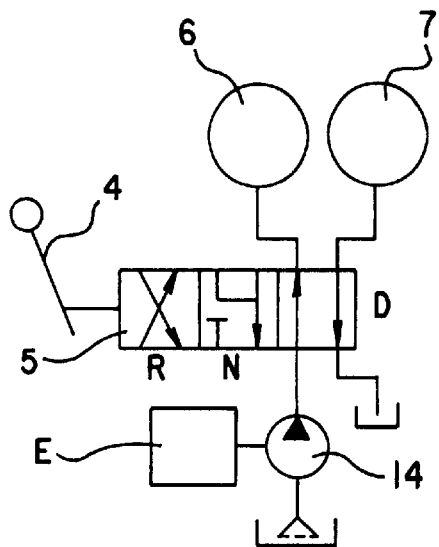
FIG. 5 is a schematic diagram showing a hydraulic circuit for operating the frictional elements, which are used for a forward/reverse switching planetary gear set, in the hybrid vehicle of the conventional technique.

On the other hand, when parking the running vehicle and then stopping the engine E, the select lever 4 (shown in FIG. 5) stays at the D range (drive range) unless the driver operates it. The hydraulic switching valve 5 (shown in FIG. 5) engages with the frictional element 6 (or the frictional element 7 when in reverse) so that the forward/reverse switching planetary gear set 3 selects the forward mode. The unstable oil pressure just after the start-up of the oil pump 14 is also provided to the frictional element 6 (or to the frictional element 7 when in reverse).

If the clutch 22 is engaged, the frictional element 6 (or the frictional element 7 when in reverse) and the CVT 8 are rotated while the uncontrolled oil pressure is provided thereto, and the shock due to the oil pressure conducted to the frictional elements 6 and 7 and the CVT 8 is directly transmitted to the drive wheel 16, degrading the driving comfort. According to this invention, the electrically controlled pressure control valve 23 gradually increases the torque capacity of the clutch 22 so as to control the transmission of the torque from the CVT 8 to the drive shaft 16 until the oil pressure becomes stable. Thus, the shock is prevented from being transmitted to the drive shaft 16.

As described above, the hybrid vehicle 21 has the clutch 22 and the final reduction gear 15 between the driven pulley 11 and the driving/regenerating motor M. The clutch 22 intervenes between the final reduction gear 15 and the driven pulley 11, and disconnects the transmission of the force when the engine E is stopped. Therefore, when driving the vehicle only by the driving/regenerating motor M, the CVT 8 is not rotated and does not cause a load on the driving/regenerating motor M. Thus, the energy loss can be reduced, and the fuel consumption can be improved.

Particularly, the CVT 8 presses the metal belt 10 onto the driving pulley 9 and driven pulley 11 using the oil pressure which is produced by the oil pump 14 driven by the engine E. Therefore, when the engine E is stopped, the oil pump 14 is also stopped, and the pressing force between the driving and driven pulleys 9 and 11 and the metal belt 10 is not sufficient. When driving the vehicle by the driving/regenerating motor M, the CVT 8 is not rotated, the metal belt 10 does not slip on the driving pulleys 9 and the driven pulley 11 at a relative speed, and the adverse effects on the life of the metal belt 10 can be avoided. Thus, the durability of the metal belt 10 can be improved.

According to the hybrid vehicle 21, when starting the engine E while driving the vehicle only by the driving/regenerating motor M, the electrically controlled pressure control valve 23 controls the clutch 22 to gradually transmit the force. Therefore, the shock, which arises just when the engine E is connected to the driving/regenerating motor M, is reduced, and the driving comfort can be improved. Particularly, since the CVT 8 and the frictional elements 6 and 7 are controlled by the oil pressure produced by the oil pump 14, the unstable oil pressure due to the start-up of the engine E should not be provided to the CVT 8 and to the frictional elements 6 and 7, to avoid the unexpected shock. According to this invention, the clutch 22 effectively reduces the transmission of the shock, to thereby ensure the driving comfort.

Further, according to the hybrid vehicle 21, the clutch 22 is operated by the oil pressure from the oil pump 14, disconnects the transmission of the force when the oil pressure is unavailable, and connects the transmission of the force when the oil pressure is available. Therefore, the clutch 22 can easily connect or disconnect the transmission of the force in response to the starting or stopping of the engine E.

This invention may be embodied in other forms or carried out in other ways without departing from the spirit thereof The present embodiments are therefore to be considered in all respects illustrative and not limiting, the scope of the invention.

Figure 3:
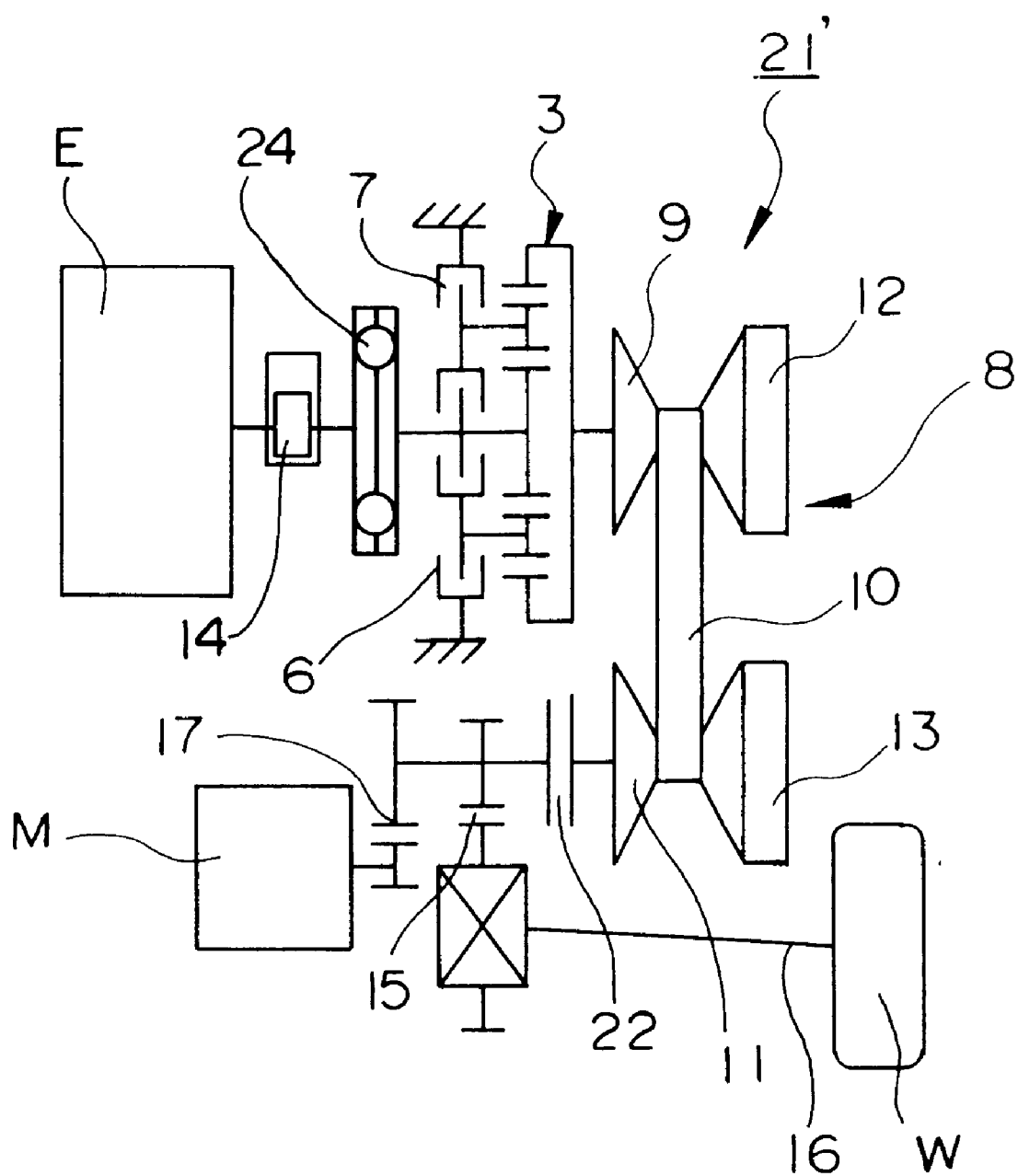
FIG. 3 is a schematic diagram showing the power train of another embodiment of the hybrid vehicle of the present invention.
Figure 4:
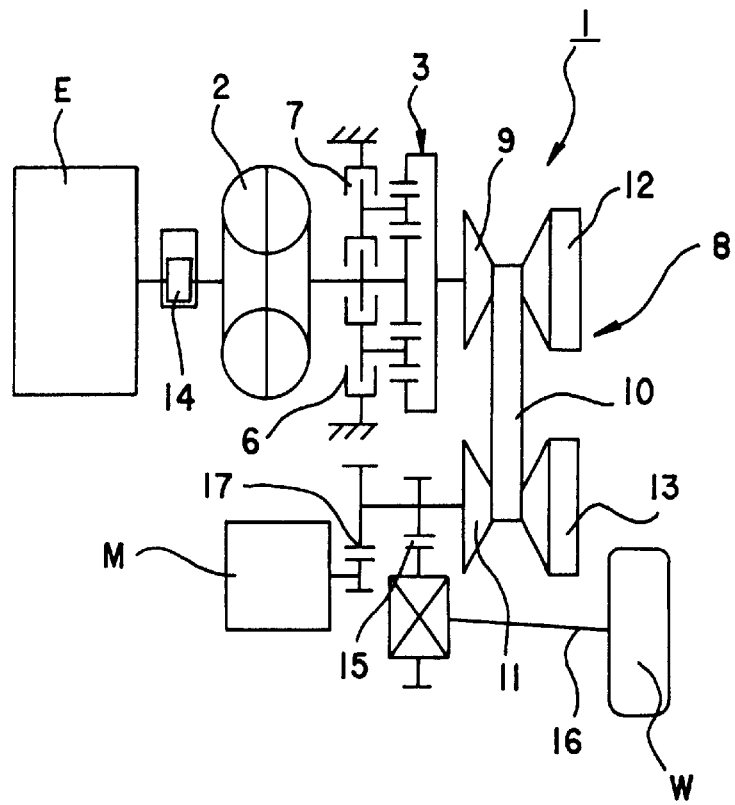
FIG. 4 is a schematic diagram showing the power train of the hybrid vehicle of the conventional technique.

For example, the torque converter 2 in the embodiment can be substituted for a vibration damper 24 in a hybrid vehicle 21' shown in FIG. 3.

In the embodiment, a motor for starting the engine E may be provided between the driving pulley 9 and the engine E.

While in the above embodiment the clutch 22 is operated by the oil pressure from the oil pump 14, the clutch 22 may be an electromagnetic clutch which is electrically controlled.

While in the above embodiment the final reduction gear 15 is provided between he driving/regenerating motor M and the driven pulley 11, the driving/regenerating motor M may be provided between the final reduction gear 15 and the driven pulley 11, and the clutch 22 may be provided between the driven pulley 11 and the driving/regenerating motor M.

When starting the engine E, the control of the transmitted torque capacity of the clutch 22 is not limited to the embodiment, and the transmission of the torque may be started after the oil pressure from the oil pump 14 becomes stable.

This invention may employ other elements without departing from the spirit thereof The above modifications may be appropriately combined.

As described above, in the hybrid vehicle according to the first invention, the motor and the driving force transmitting device are connected to the second pulley of the continuously variable transmission, and the transmission of the force through the engaging element can be disconnected when the internal combustion engine is stopped. Therefore, when driving the vehicle only by the motor, the continuously variable transmission is prevented from being rotated, and does not cause a load on the motor. Thus, the energy loss can be avoided, and the fuel consumption can be improved.

In the hybrid vehicle according to the second invention, when the internal combustion engine is stopped and the oil pressure producing mechanism is simultaneously stopped, the pressing force which acts on the metal belt and the first and second pulleys is not sufficient, and, even when driving the vehicle by the motor, the continuously variable transmission is not rotated. Therefore, the metal belt does not slip on the first and second pulleys at a relative speed, the adverse effects on the life of the metal belt can be avoided, and the durability of the metal belt can be improved.

In the hybrid vehicle according to the third invention, when starting the internal combustion engine while driving the vehicle only by the motor, the engaging element controls the transmission of the force to reduce the shock arising from the connecting of the internal combustion engine to the motor, thereby improving the driving comfort. Particularly, when the continuously variable transmission is operated by the oil pressure provided from the oil pressure producing mechanism, an unexpected shock may occur in the conventional art when the unstable oil pressure is provided to the continuously variable transmission at the time of starting the internal combustion engine. According to the present invention, the engaging element reduces the transmission of the shock, thereby ensuring the driving comfort.

In the hybrid vehicle according to the fourth invention, the engaging element is operated by oil pressure from the oil pressure producing mechanism, and connects the transmission of the force when the oil pressure is provided to the engaging element, and disconnects the transmission of the force when the oil pressure is not provided to said engaging element. Therefore, the transmission of the force by the engaging element can be easily and securely connected or disconnected in response to the starting or stopping of the internal combustion engine, and the second and third inventions can be embodied in a better form.

What is claimed is:

1. A hybrid vehicle having a driveshaft connected to driving wheels, comprising:

an internal combustion engine;

a continuously variable transmission for transmitting a force between a first pulley and a second pulley through a metal belt; and a motor, wherein an output shaft of said internal combustion engine is connected to said first pulley, said second pulley is connected to an output shaft of said motor, said output shaft of said motor is connected to a driving force transmitting device for transmitting a driving force from said second pulley and said motor to said driveshaft, said motor and said driving force transmitting device are connected to said second pulley via an engaging element for selectively connecting or disconnecting the transmission of the driving force to said second pulley, said output shaft of said motor being connected to said driveshaft through a final reduction gear, said engaging element disconnects the transmission of the force when said internal combustion engine is stopped, and wherein said continuously variable transmission presses said metal belt onto said first pulley and onto said second pulley by oil pressure from an oil pressure producing mechanism which is driven by said internal combustion engine.

2. A hybrid vehicle according to claim 1, further comprising a transmitted force control mechanism for controlling the transmission of the force through said engaging element when starting said internal combustion engine while driving said vehicle only by said motor.

3. A hybrid vehicle according to claim 1, wherein said engaging element is operated by oil pressure from said oil pressure producing mechanism, connects the transmission of the force when the oil pressure is provided to said engaging element, and disconnects the transmission of the force when the oil pressure is not provided to said engaging element.

4. A hybrid vehicle comprising:

an internal combustion engine;

a torque converter;

a forward/reverse switching planetary gear set;

a continuously variable transmission for transmitting a force between a first pulley and a second pulley through a metal belt; and a motor, wherein an output shaft of said internal combustion engine is connected to said first pulley via said torque converter and said planetary gear set, said second pulley is connected to an output shaft of said motor, said output shaft of said motor is connected to a driving force transmitting device for transmitting a driving force from said second pulley and said motor to a driveshaft, said motor and said driving force transmitting device are connected to said second pulley via an engaging element for selectively connecting or disconnecting the transmission of the driving force to said second pulley, and said engaging element disconnects the transmission of the force when said internal combustion engine is stopped.

\* \* \* \* \*